(12) United States Patent
Yoshida

(10) Patent No.: US 10,965,570 B2
(45) Date of Patent: Mar. 30, 2021

(54) REMOTE CONTROL DEVICE, SYSTEM, METHOD, AND RECORDING MEDIUM FOR DETERMINING A DELAY SETTING VALUE

(71) Applicant: NEC Corporation, Tokyo (JP)

(72) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 16/325,779

(22) PCT Filed: Aug. 7, 2017

(86) PCT No.: PCT/JP2017/028647
§ 371 (c)(1),
(2) Date: Feb. 15, 2019

(87) PCT Pub. No.: WO2018/034191
PCT Pub. Date: Feb. 22, 2018

(65) Prior Publication Data
US 2019/0215254 A1    Jul. 11, 2019

(30) Foreign Application Priority Data
Aug. 17, 2016    (JP) .................................. 2016-160139

(51) Int. Cl.
*H04L 12/26* (2006.01)
*G05B 11/36* (2006.01)
*G06N 7/00* (2006.01)

(52) U.S. Cl.
CPC ............ *H04L 43/087* (2013.01); *G05B 11/36* (2013.01); *G06N 7/005* (2013.01)

(58) Field of Classification Search
CPC .. H04L 43/0852; H04L 43/087; H04J 3/0682; H04J 3/0667; H04J 3/0632; G05B 11/36; G05B 13/04; G06N 7/005
See application file for complete search history.

(56) References Cited

U.S. PATENT DOCUMENTS

| 6,243,610 B1 | 6/2001 | Iino et al. |
| 2010/0022302 A1* | 1/2010 | Iwakiri .................. A63F 13/12 463/30 |

(Continued)

FOREIGN PATENT DOCUMENTS

| JP | 11-065609 A | 3/1999 |
| JP | 2014-068087 A | 4/2014 |

(Continued)

OTHER PUBLICATIONS

International Search Report for PCT/JP2017/028647 dated Oct. 24, 2017 [PCT/ISA/210].

(Continued)

*Primary Examiner* — Peter Chen
(74) *Attorney, Agent, or Firm* — Sughrue Mion, PLLC

(57) ABSTRACT

In order to improve a transient response and stability of remote control when a transmission delay varies, a remote control device receives a control result from a control target device, generates control data for performing a feedback control with dead time compensation, based on the control result and a delay setting value, determines the delay setting value, based on a history of a delay amount of transmitted/ received data to/from the control target device, transmits the delay setting value, and transmits the control data and a generation time of the control data. And, a delay adjustment device receives control data from a remote control device and storing the control data, receives a delay setting value to be used for dead time compensation in the remote control device, and outputs the control data to a control target, based on the delay setting value and a generation time of the control data.

14 Claims, 12 Drawing Sheets

(56) References Cited

U.S. PATENT DOCUMENTS

2015/0085852 A1* 3/2015 Mizutani ............... H04J 3/0667
370/350
2015/0304193 A1 10/2015 Ishii et al.

FOREIGN PATENT DOCUMENTS

JP          5565431 B2   8/2014
JP       2016-519344 A   6/2016

OTHER PUBLICATIONS

Written Opinion for PCT/JP2017/028647 dated Oct. 24, 2017 [PCT/ISA/237].

* cited by examiner

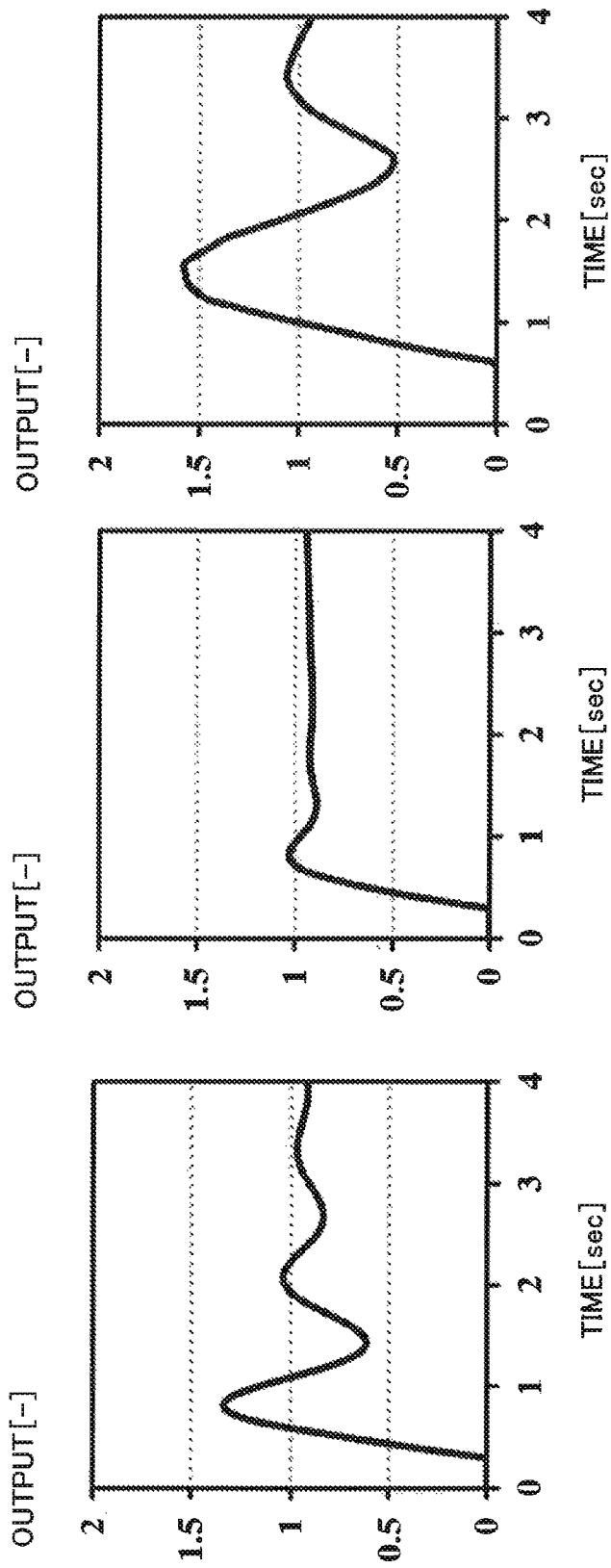

REMOTE CONTROL DEVICE, SYSTEM, METHOD, AND RECORDING MEDIUM FOR DETERMINING A DELAY SETTING VALUE

Cross Reference To Related Applications

This application is a National Stage of International Application No. PCT/JP2017/028647 filed Aug. 7, 2017, claiming priority based on Japanese Patent Application No. 2016-160139 filed Aug. 17, 2016, the disclosure of which is incorporated herein in its entirety by reference.

TECHNICAL FIELD

The present invention relates to a remote control device, a system, a method, and a recording medium for remotely controlling a control target device.

BACKGROUND ART

When controlling a machine such as an Unmanned Aircraft System (UAS) or an Automatic Guided Vehicle (AGV), a remote control by wireless communication is performed in order to eliminate restrictions on movement and arrangement of the machine. In recent years, various works have utilized the Internet, and thus there is a demand for enabling machines that perform such works to be connected to the Internet. Accordingly, communications with these machines being performed by an Internet protocol (IP) have been increasing.

However, in wireless IP communication, a delay in arrival of data packets, and a delay variation (delay jitter) in packet arrival occur due to a wireless radio-wave strength, radio wave interference, noise, or other communication traffic. In the remote control using wireless IP communication, control performance (stability and transient response) may be impaired due to an effect of the packet arrival delay and the delay jitter in packet arrival.

In particular, in a control system, not a large delay itself, but a large delay jitter makes it difficult to achieve high control performance. Also, even when a delay occurs in a communication network, if the delay is a fixed delay without delay variation, the control performance can be improved by general dead time compensation such as a Smith predictor.

FIGS. 12A-12C show graphs illustrating a result (when an initial value is 0 and a control target value is 1) of a feedback control on a certain control target (first-order lag system). FIG. 12A illustrates a result obtained when a control is performed by using a Proportional Integral (PI) compensator in a case where a fixed delay of 0.3 msec is present. Since the delay (dead time) is present, it needs a long time for a control output to converge to "1" being a target value. On the other hand, FIG. 12B illustrates an example of a control result obtained in a case where a Smith predictor is provided in addition to the PI compensator in consideration of an effect of a delay (dead time). It is obvious that the effect of the dead time is suppressed and the control performance is greatly improved. FIG. 12C illustrates a control result obtained in a case where a control with the Smith predictor in FIG. 12B is carried out in an environment in which the delay is randomly varied in a range from 0.1 msec to 0.8 msec. It is obvious that advantageous effects cannot be obtained when the delay varies, with the Smith predictor. This is because control data arrive at a control target device with a delay amount different from the delay amount assumed in the dead time compensation, due to variation in the delay.

As a remote control method, for example, PTL 1 describes a method of a feedback control with dead time compensation. In addition, as a method for absorbing a delay jitter in packet arrival time in a control target device, PTL 2 describes a method of determining a jitter buffer length for absorbing a delay jitter, based on a delay jitter amount on a data reception side.

However, even when a dead time compensation method such as the method described in PTL 1 and a delay variation absorbing method such as the method described in PTL 2 are combined, in a case where a delay amount assumed by a control device is different from a delay amount of control data input to a control target, it is difficult to perform a stable control.

On the other hand, a control device described in PTL 3 uses first data transmitted from a control target via a communication network, and transmits, to the control target, second data for controlling the control target via the communication network. Further, the control device transmits the second data at a timing after a lapse of a time obtained after deduction of a difference between a time when the control target receives the first data and a time when the first data are generated (arrival delay time of first data) from a maximum allowable delay time. As a result, the control device described in PTL 3 sets all delays in the communication network to the maximum allowable delay, thereby making it possible to improve stability of a feedback control with dead time compensation even when a delay jitter is present.

In addition, PTL 4 describes a method for a feedback control with dead time compensation, in which a control device transmits control data corresponding to a plurality of assumed delay times, and a control target device selects control data depending on a measured delay time. Also, in this method, a delay amount assumed by the control device and a delay amount of control data can be set in such a way as to match each other, and therefore, stability of control can be improved even when a delay jitter is present.

CITATION LIST

Patent Literature

[PTL 1] Japanese Translation of PCT International Publication for Patent Application, No. 2016-519344
[PTL 2] Japanese Unexamined Patent Application Publication No. 2014-068087
[PTL 3] Japanese Patent No. 5565431
[PTL 4] Japanese Unexamined Patent Application Publication No. H11-065609

SUMMARY OF INVENTION

Technical Problem

However, in the remote control system described in PTL 3, control data are delayed to a maximum allowable delay time in a fixed manner, regardless of an actual delay amount in a communication network, and are input data to a control target. Accordingly, in an environment in which the packet arrival delay and delay jitter are small, an unnecessary delay is inserted. Since a transient response (tracking performance) of control improves as a delay decreases, the transient response deteriorates in this method.

Further, according to the method described in PTL 4, in an environment in which a delay variation is large, the control device needs to transmit a large amount of control data for a large number of assumed delay times. When the amount of control data increases, the network is congested and the delay increases, which may lead to a deterioration in the transient response of control. Further, when the amount of control data is small, a difference between the delay time assumed by the control device and the delay amount of control data increases, which may lead to a deterioration in stability of control.

An object of the present invention is to provide a remote control device, a system, a method, and a recording medium which can improve a transient response and stability of remote control when a transmission delay varies.

Solution to Problem

For settling the above-mentioned problem, a remote control device according to an exemplary aspect of the invention comprises: a control result reception means for receiving a control result from a control target device, a control data generation means for generating control data for performing a feedback control with dead time compensation on the control target device, based on the control result and a delay setting value, a delay setting value determination means for determining the delay setting value, based on a history of a delay amount of transmitted/received data transmitted/received to/from the control target device, a delay amount transmission means for transmitting the delay setting value, and a control data transmission means for transmitting the control data and a generation time of the control data.

And, a delay adjustment device according to an exemplary aspect of the invention comprises: a control data reception means for receiving control data from a remote control device and storing the control data in a control data storage means, a delay setting value reception means for receiving a delay setting value to be used for dead time compensation in the remote control device, and a control data output means for outputting, to a control target, the control data in the control data storage means, based on the delay setting value and a generation time of the control data.

And, a remote control method according to an exemplary aspect of the invention comprises: receiving a control result from a control target device, generating control data for performing a feedback control with dead time compensation on the control target device, based on the control result and a delay setting value, determining the delay setting value, based on a history of a delay amount of transmitted/received data transmitted/received to/from the control target device, transmitting the delay setting value, and transmitting the control data and a generation time of the control data.

And, a delay adjustment method according to an exemplary aspect of the invention comprises: receiving control data from a remote control device and storing the control data in a control data storage unit, receiving a delay setting value to be used for dead time compensation in the remote control device, and outputting, to a control target, the control data in the control data storage unit, based on the delay setting value and a generation time of the control data.

And, a non-transitory computer readable recording medium according to an exemplary aspect of the invention is recorded with a remote control program causing a computer to execute: a control result reception function of receiving a control result from a control target device, a control data generation function of generating control data for performing a feedback control with dead time compensation on the control target device, based on the control result and a delay setting value, a delay setting value determination function of determining the delay setting value, based on a history of a delay amount of transmitted/received data transmitted/received to/from the control target device, a delay amount transmission function of transmitting the delay setting value, and a control data transmission function of transmitting the control data and a generation time of the control data.

And, a non-transitory computer readable recording medium according to an exemplary aspect of the invention is recorded with a delay adjustment program causing a computer to execute: a control data reception function of receiving control data from a remote control device and storing the control data in a control data storage unit, a delay setting value reception function of receiving a delay setting value to be used for dead time compensation in the remote control device, and a control data output function of outputting, to a control target, the control data in the control data storage unit, based on the delay setting value and a generation time of the control data.

Advantageous Effects of Invention

A remote control device, a system, a method, and a recording medium according to the present invention can improve a transient response and stability of remote control when a transmission delay varies.

BRIEF DESCRIPTION OF DRAWINGS

FIGS. 12A-12C show each illustrating an example of control outputs of a PI compensator and a Smith predictor.

EXAMPLE EMBODIMENT

First Example Embodiment

A first example embodiment of the present invention will be described.

Figure 1:
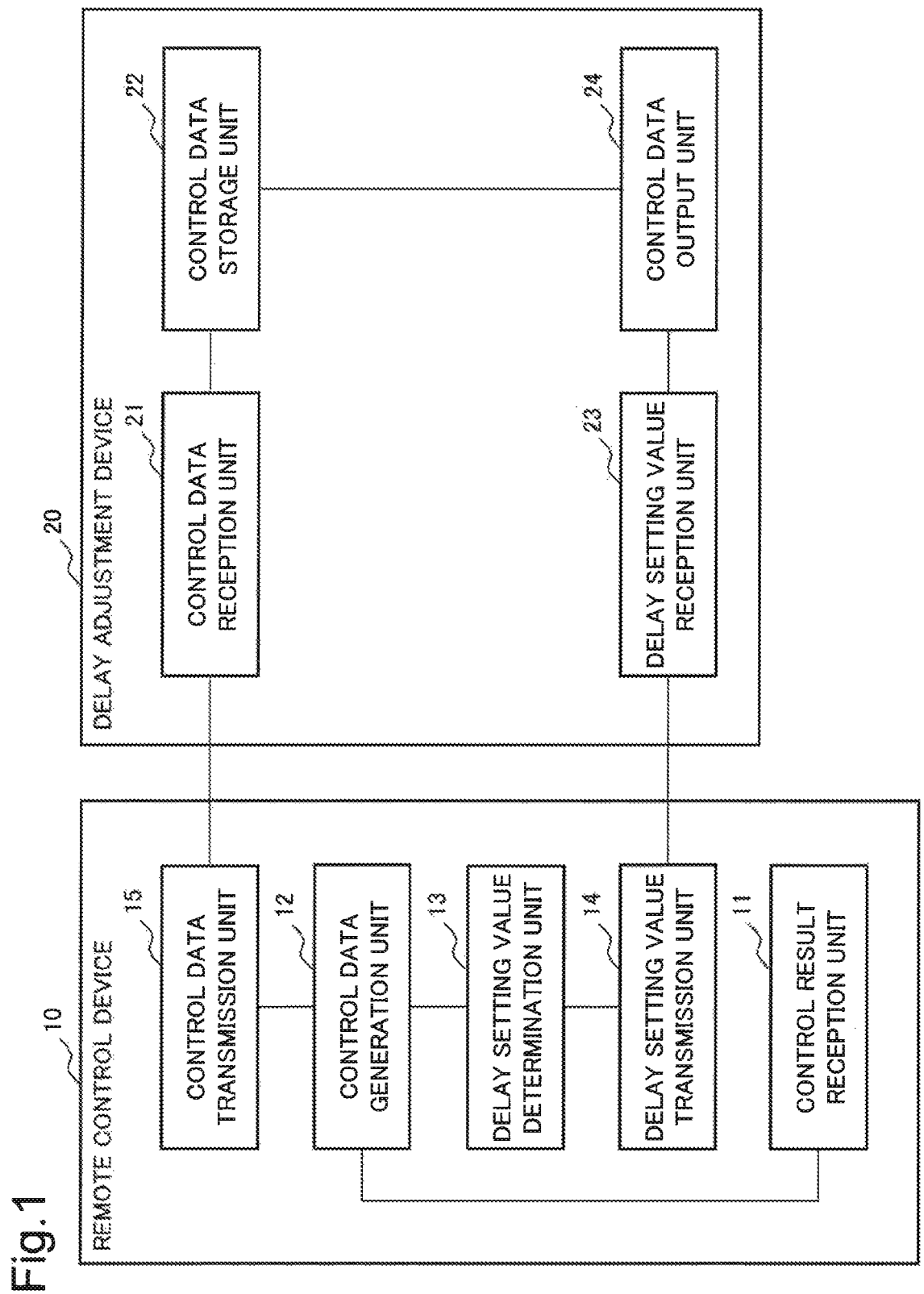
FIG. 1 shows a diagram illustrating a configuration example of each of a remote control device and a delay adjustment device according to a first example embodiment of the present invention.

FIG. 1 illustrates a configuration example of each of a remote control device 10 and a delay adjustment device 20 according to this example embodiment.

The remote control device 10 according to this example embodiment includes a control result reception unit 11, a control data generation unit 12, a delay setting value determination unit 13, a delay setting value transmission unit 14, and a control data transmission unit 15.

The control result reception unit 11 is a portion that receives a control result from a control target device. The control data generation unit 12 is a portion that generates control data to perform a feedback control with dead time compensation on the control target device based on the control result and a delay setting value. The delay setting value determination unit 13 is a portion that determines the delay setting value based on a history of a delay amount of transmitted/received data transmitted/received to/from the control target device. The delay setting value transmission unit 14 is a portion that transmits the delay setting value. The control data transmission unit 15 is a portion that transmits control data and a generation time of the control data.

The delay adjustment device 20 according to this example embodiment includes a control data reception unit 21, a control data storage unit 22, a delay setting value reception unit 23, and a control data output unit 24.

The control data reception unit 21 is a portion that receives control data from the remote control device 10 and stores the control data in the control data storage unit 22. The delay setting value reception unit 23 is a portion that receives the delay setting value used for dead time compensation control in the remote control device 10. The control data output unit 24 is a portion that outputs, to a control target, the control data in the control data storage unit based on the delay setting value and a generation time of the control data.

By configuring the remote control device 10 and the delay adjustment device 20 as described above, the remote control device 10 determines the delay setting value based on the history of the delay amount, transmits the delay setting value to the delay adjustment device 20, and generates the control data based on the delay setting value. Further, the delay adjustment device 20 outputs, to the control target, the control data in the control data storage unit based on the delay setting value and the generation time of the control data. Thus, since the delay setting value can be determined based on the history of the delay amount, a transient response of remote control is improved. Further, since the control data can be output to the control target depending on the delay setting value used for generating the control data, the stability of remote control is improved. Therefore, it is possible to improve the transient response and stability of remote control when a transmission delay varies.

Figure 2:
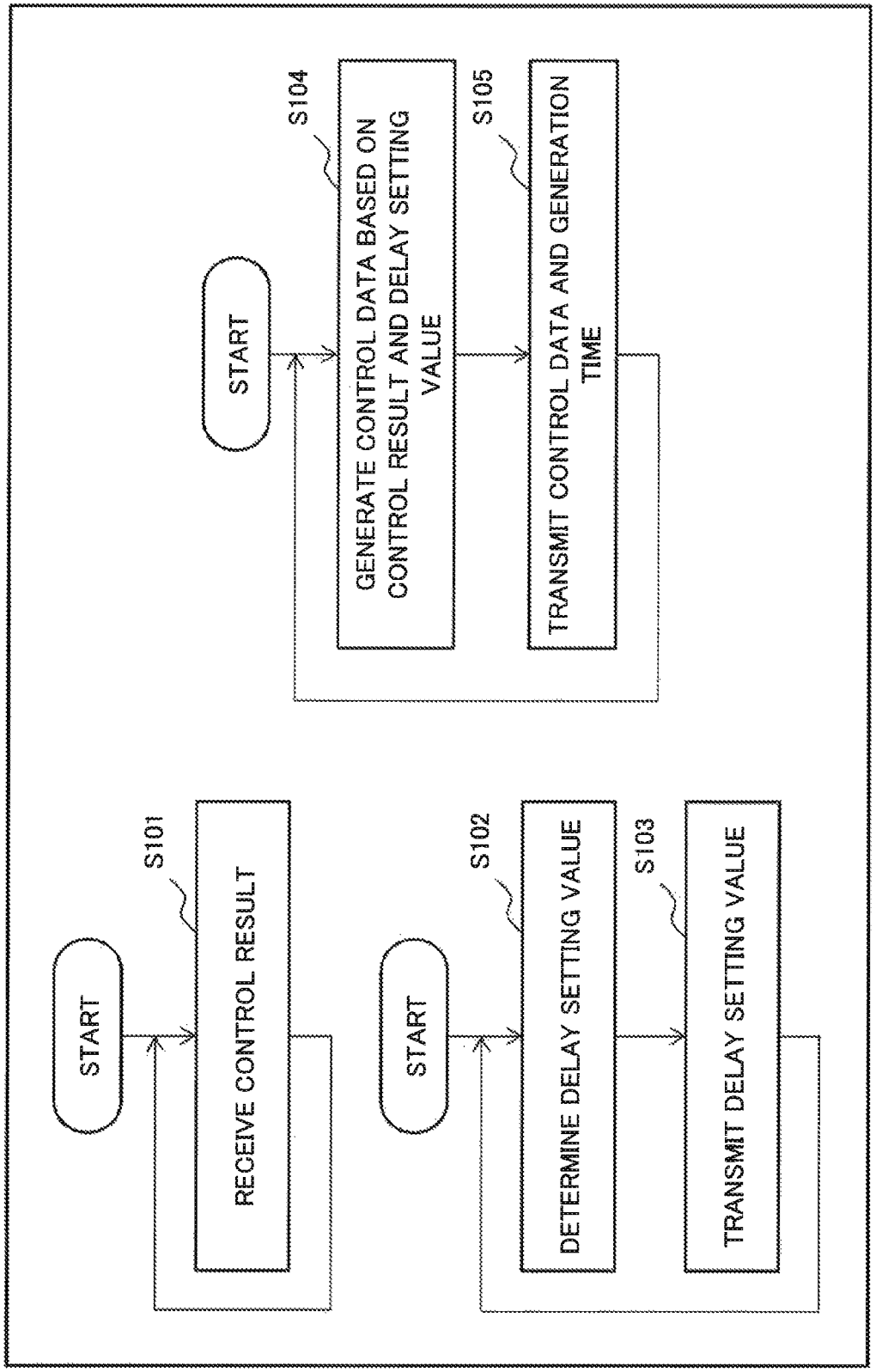
FIG. 2 shows a diagram illustrating an operational example of the remote control device according to the first example embodiment of the present invention.
Figure 3:
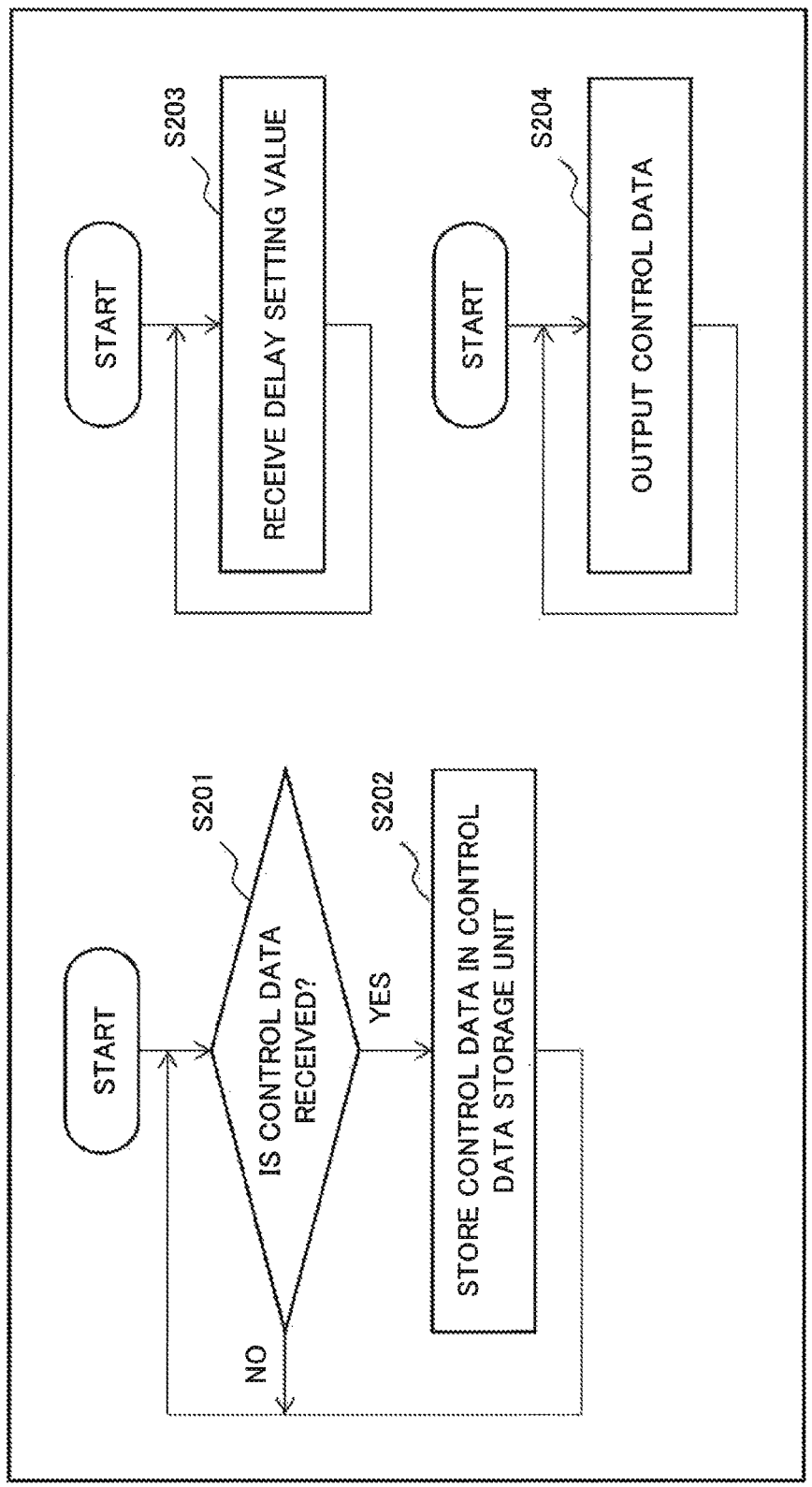
FIG. 3 shows a diagram illustrating an operational example of the delay adjustment device according to the first example embodiment of the present invention.

Next, FIGS. 2 and 3 illustrate operational examples of the remote control device 10 and the delay adjustment device 20 according to this example embodiment. FIG. 2 illustrates an operational example of the remote control device 10 according to this example embodiment. FIG. 3 is an operational example of the delay adjustment device 20 according to this example embodiment.

The control result reception unit 11 of the remote control device 10 receives the control result from the control target device (step S101). The delay setting value determination unit 13 determines the delay setting value based on the history of the delay amount of transmitted/received data transmitted/received to/from the control target device (step S102). The delay setting value transmission unit 14 transmits the delay setting value (step S103). The control data generation unit 12 generates the control data to perform a feedback control with dead time compensation on the control target device based on the control result and the delay setting value (step S104). The control data transmission unit 15 transmits the control data and the generation time of the control data (step S105).

Further, the control data reception unit 21 of the delay adjustment device 20 receives control data from the remote control device 10 (YES in step S201), and stores the control data in the control data storage unit 22 (step S202). The delay setting value reception unit 23 receives the delay setting value used for dead time compensation control in the remote control device 10 (step S203). The control data output unit 24 outputs, to the control target, the control data in the control data storage unit based on the delay setting value and the generation time of the control data (step S204).

By the operation as described above, the remote control device 10 determines the delay setting value based on the history of the delay amount, transmits the delay setting value to the delay adjustment device 20, and generates the control data based on the delay setting value. The delay adjustment device 20 outputs, to the control target, the control data in the control data storage unit based on the delay setting value and the generation time of the control data. Thus, since the delay setting value can be determined based on the history of the delay amount, the transient response of remote control is improved. Further, since the control data can be output to the control target depending on the delay setting value used for generating the control data, the stability of remote control is improved. Therefore, it is possible to improve the transient response and stability of remote control when a transmission delay varies.

As described above, in the first example embodiment of the present invention, the remote control device 10 determines the delay setting value based on the history of the delay amount, transmits the delay setting value to the delay adjustment device 20, and generates the control data based on the delay setting value. The delay adjustment device 20 outputs, to the control target, the control data stored in the control data storage unit based on the delay setting value and the generation time of the control data. Therefore, it is possible to improve the transient response and stability of remote control when a transmission delay varies.

Second Example Embodiment

Next, a second example embodiment of the present invention will be described.

In this example embodiment, the remote control device and the delay adjustment device according to the first example embodiment will be described in more detail.

Figure 4:
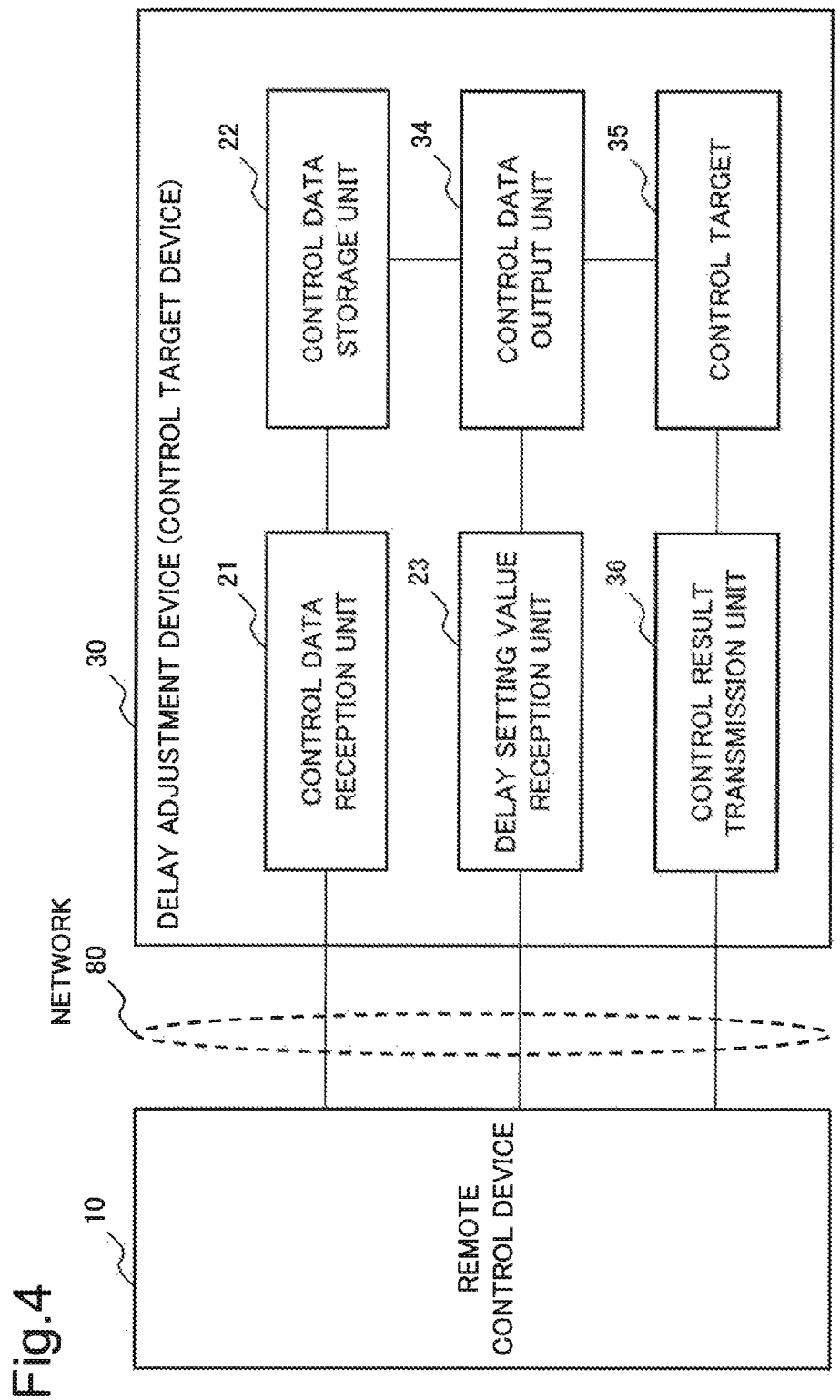
FIG. 4 shows a diagram illustrating a configuration example of a remote control system according to a second example embodiment of the present invention.

First, FIG. 4 illustrates a configuration example of a remote control system according to this example embodiment. The remote control system according to this example embodiment includes the remote control device 10 and a delay adjustment device 30.

Figure 5:
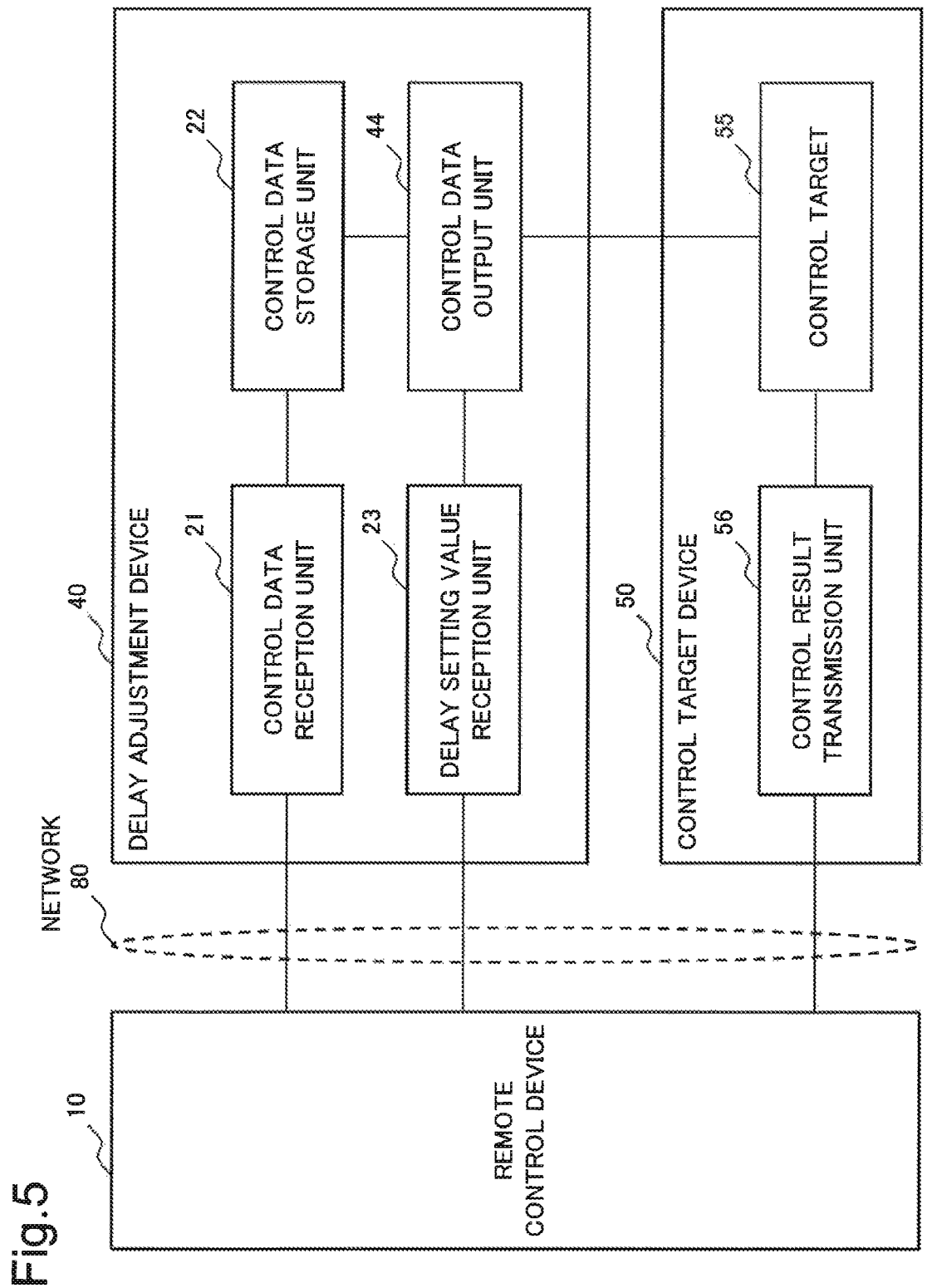
FIG. 5 shows a diagram illustrating a configuration example of the remote control system according to the second example embodiment of the present invention.

The remote control device 10 is a device that generates control data for the control target and transmits the control data to the delay adjustment device 30 via a network 80. The delay adjustment device 30 is a device that outputs the received control data to the control target. In this example embodiment, the delay adjustment device 30 is a control target device. The control target device is controlled based on the control data, and feeds back a control result (data on a position, a speed, etc.) to the remote control device 10. Note that the remote control system according to this example embodiment may have a configuration in which a control target device 50 and a delay adjustment device 40 are separated from each other as illustrated in FIG. 5. In the case of FIG. 5, the delay adjustment device 40 includes a control data output unit 44. However, the control target device 50 may include the control data output unit 44.

The network 80 is an IP network composed of, for example, a Local Area Network (LAN), a wireless LAN, the Internet, or a mobile network (Long Term Evolution (LTE)/3 Generation (G)/Worldwide Interoperability for Microwave Access (WiMAX)).

Next, a configuration example of the remote control device 10 according to this example embodiment will be described by using FIG. 1.

The control result reception unit 11 is a portion that receives the control result from the control target device (in the case of this example embodiment, the delay adjustment device 30). The control data generation unit 12 is a portion that generates control data to perform a feedback control with dead time compensation on the control target device based on the control result and the delay setting value. The delay setting value determination unit 13 is a portion that determines a delay setting value based on a history of a delay amount of transmitted/received data transmitted/received to/from the control target device. The delay setting value transmission unit 14 is a portion that transmits the delay setting value. The control data transmission unit 15 is a portion that transmits control data and a generation time of the control data.

Figure 6:
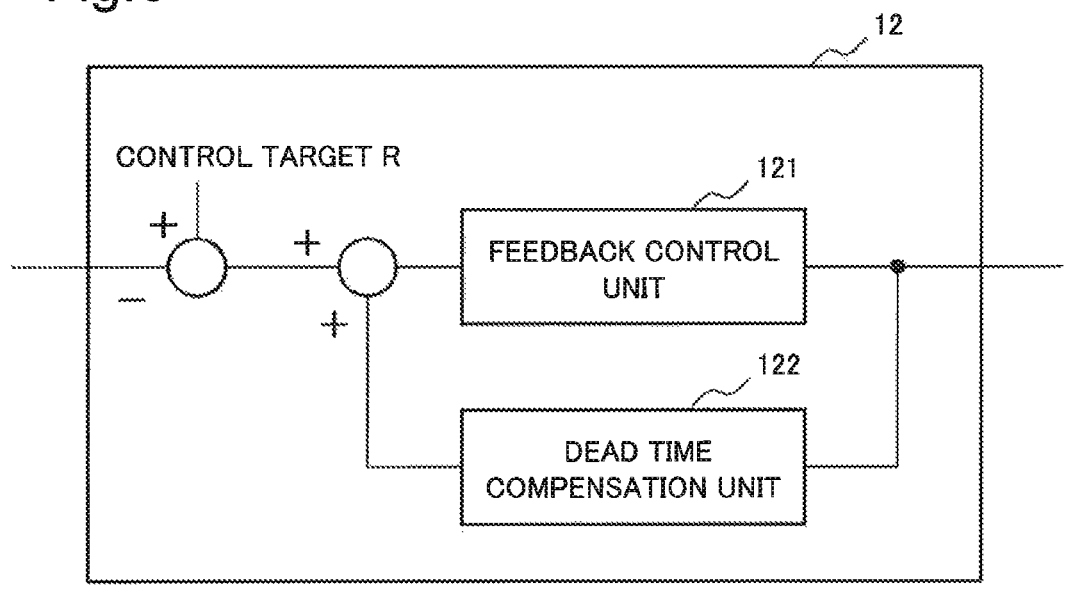
FIG. 6 shows a diagram illustrating a configuration example of a control data generation unit according to the second example embodiment of the present invention.

Next, FIG. 6 illustrates a more detailed configuration example of the control data generation unit 12. The control data generation unit 12 includes a feedback control unit 121 and a dead time compensation unit 122.

The feedback control unit 121 is a portion (compensator) that performs a feedback control on a control target. The feedback control unit 121 generates control data for the control target based on a control target R and a control result fed back from the control target device. As the feedback control unit 121, for example, a Proportional Integral Differential (PID) compensator, a phase lead compensator, a phase lag compensator, or the like can be used.

For example, when a PI compensator is adopted as the feedback control unit 121, a transfer function C(s) for the feedback control unit 121 is represented by Expression 1.

$$C(s)=K_P+K_I/S \qquad \text{(Expression 1)}$$

Note that KP represents a proportional gain, and KI represents an integral gain.

The dead time compensation unit 122 is a portion (predictor) that compensates for a delay (dead time) in the network 80 with respect to the control data generated by the feedback control unit 121. As a method for dead time compensation, for example, Smith prediction, internal model control, model prediction control, or the like can be used.

In the case of using a Smith predictor as the dead time compensation unit 122, assuming that a transfer function representing a control target is represented by G(s) and a delay amount (dead time) in the network 80 is represented by L, a transfer function P(s) for the Smith predictor can be expressed as Expression 2.

$$P(s)=G(s)(e^{-Ls}-1) \qquad \text{(Expression 2)}$$

Note that the delay amount L is the total (referred to as a round-trip time) of delay amounts in an outbound pass and an inbound pass in the network 80.

In this example embodiment, as a parameter for the delay amount in the dead time compensation unit 122, the delay setting value determined by the delay setting value determination unit 13 is used. For example, in the case of using a Smith predictor as the dead time compensation unit 122, the delay setting value determined by the delay setting value determination unit 13 as L in Expression 2.

Next, the delay setting value determination unit 13 will be described in more detail.

The delay setting value determination unit 13 determines the delay setting value based on the history of the delay amount of transmitted/received data transmitted/received to/from the control target device (delay adjustment device 30).

The delay setting value determination unit 13 measures the delay amount in the network 80. Further, for example, based on the history of the delay amount, an upper limit L+ of the delay amount in future is predicted. This upper limit L+ is set as the delay setting value.

As a prediction method, for example, a method in which an appropriate time series model is identified from the history of past delay amounts and a probability distribution (probability density function) of future delay amounts is predicted from the identified time series model can be used. As the time series model, for example, an Auto Regressive (AR) model, a Moving Average (MA) model, an Auto Regressive Integrated Moving Average (ARIMA) model, a Generalized Auto Regressive Conditional Heteroscedasticity (GARCH) model, or the like can be used. If the time series model can be identified from the history of past delay amounts, a probability distribution (probability density function) f (L, t) of future delay amounts can be calculated. Note that f represents a probability density function, L represents a delay amount, and t represents time.

The delay setting value determination unit 13 calculates the upper limit L+ of future delay amounts by, for example, Expression 3, based on the probability distribution f (L, t) of future delay amounts.

$$L+(t)=\mu(t)+\alpha\sigma(t) \qquad \text{(Expression 3)}$$

Note that $\mu(t)$ represents an expectation value E [L(t)] for the delay amount L at a time t, $\sigma(t)$ represents a standard deviation of the delay amount L at the time t (the square of $\sigma(t)$ corresponds to a variance V [L(t)] of the delay amount L at the time t), and $\alpha$ is a constant. For example, assuming that when the probability distribution f is a Gaussian distribution, $\alpha=3$ holds, an upper 3-sigma value of the delay amount can be used as an upper limit.

Note that the delay amount L is a round-trip time between the remote control device 10 and the control target device (delay adjustment device 30). The delay amount L may be measured by transmitting/receiving probe data for delay amount measurement between the remote control device 10 and the control target device, or may be calculated by receiving control data or a control result with a time stamp added.

Next, a configuration example of the delay adjustment device 30 according to this example embodiment will be described by using FIG. 4. The delay adjustment device 30 according to this example embodiment includes the control data reception unit 21, the control data storage unit 22, the delay setting value reception unit 23, a control data output unit 34, a control target 35, and a control result transmission unit 36.

The control data reception unit 21 is a portion that receives control data from the remote control device 10 and that stores the control data in the control data storage unit 22. The control data storage unit 22 is a buffer that temporarily stores the control data in order to absorb an arrival delay of the control data. The delay setting value reception unit 23 is a portion that receives the delay setting value used for dead time compensation control in the remote control device 10.

The control data output unit 34 is a portion that outputs, to the control target 35, the control data in the control data storage unit based on the delay setting value and the generation time of the control data. The control target 35 is a physical model including a driving unit for the control target device, and is a portion that is controlled based on the control data. The control result transmission unit 36 is a portion that transmits a control result (data on a position, a speed, etc.) to the remote control device 10.

In this example embodiment, the control data output unit 34 retrieves the control data from the control data storage unit 22 after a lapse of a predetermined time from the generation time of the control data, and outputs the control data to the control target 35. In this case, this predetermined time is referred to as a jitter buffer length. In this example embodiment, the control data output unit 34 uses the delay setting value received by the delay setting value reception unit 23 as the jitter buffer length.

With this configuration, each piece of control data is output to the control target when a time corresponding to the delay setting value has elapsed from the generation time of the control data. Accordingly, a jitter of an arrival delay in each piece of control data is absorbed by the control data storage unit 22.

The control data storage unit 22 has a function of absorbing the jitter of the delay and maintaining the delay in the arrival of the control data at the control target 35 to be constant. When the jitter buffer length is longer than the upper limit of the delay amount, all delay jitters can be absorbed. When the jitter buffer length is shorter than the upper limit of the delay amount, the delay in the arrival of the control data at the control target 35 varies, and the control data arrives at the control target 35 with a delay amount different from the delay amount that is assumed by the remote control device 10, and therefore, the control is made unstable. On the other hand, when the jitter buffer length is long, the arrival of the control data at the control target 35 is delayed, which leads to deterioration in transient response. Accordingly, in this example embodiment, the upper limit of the delay amount is calculated by Expression 3 by taking into consideration a tradeoff between the stability and the transient response of control. Thus, for example, when a value 3σ is set as the upper limit, 99% of delay jitters can be absorbed and a value with a jitter buffer length that is not too long can be set.

By configuring the remote control device 10 and the delay adjustment device 30 as described above, the remote control device 10 determines the delay setting value based on the history of the delay amount, transmits the delay setting value to the delay adjustment device 30, and generates control data based on the delay setting value. The delay adjustment device 30 outputs, to the control target, the control data in the control data storage unit based on the delay setting value and the generation time of the control data. Thus, since the delay setting value can be determined based on the history of the delay amount, the transient response of remote control is improved. Further, since the control data can be output to the control target depending on the delay setting value used for generating the control data, the stability of remote control is improved. Therefore, it is possible to improve the transient response and stability of remote control when a transmission delay varies.

In this example embodiment, the delay adjustment device 30 outputs the control data to the control target after a lapse of a time corresponding to the delay setting value from the generation time of the control data. Thus, the delay adjustment device 30 can set the delay amount of the control data in such a way as to match the delay setting value, which makes it possible to further improve the stability of remote control.

Further, in this example embodiment, the remote control device 10 calculates an upper limit of the delay amount in future based on the history of the delay amount, and uses the upper limit as the delay setting value. Thus, more delay jitters can be absorbed, which makes it possible to further improve the stability of remote control.

In this example embodiment, the remote control device 10 identifies a predetermined time series model from the history of the delay amount, derives a probability distribution of the delay amount in future from the time series model, and calculates an upper limit of the delay amount based on the probability distribution. Thus, it is possible to determine the delay setting value by taking into consideration a tradeoff between the stability and the transient response of control.

Figure 7:
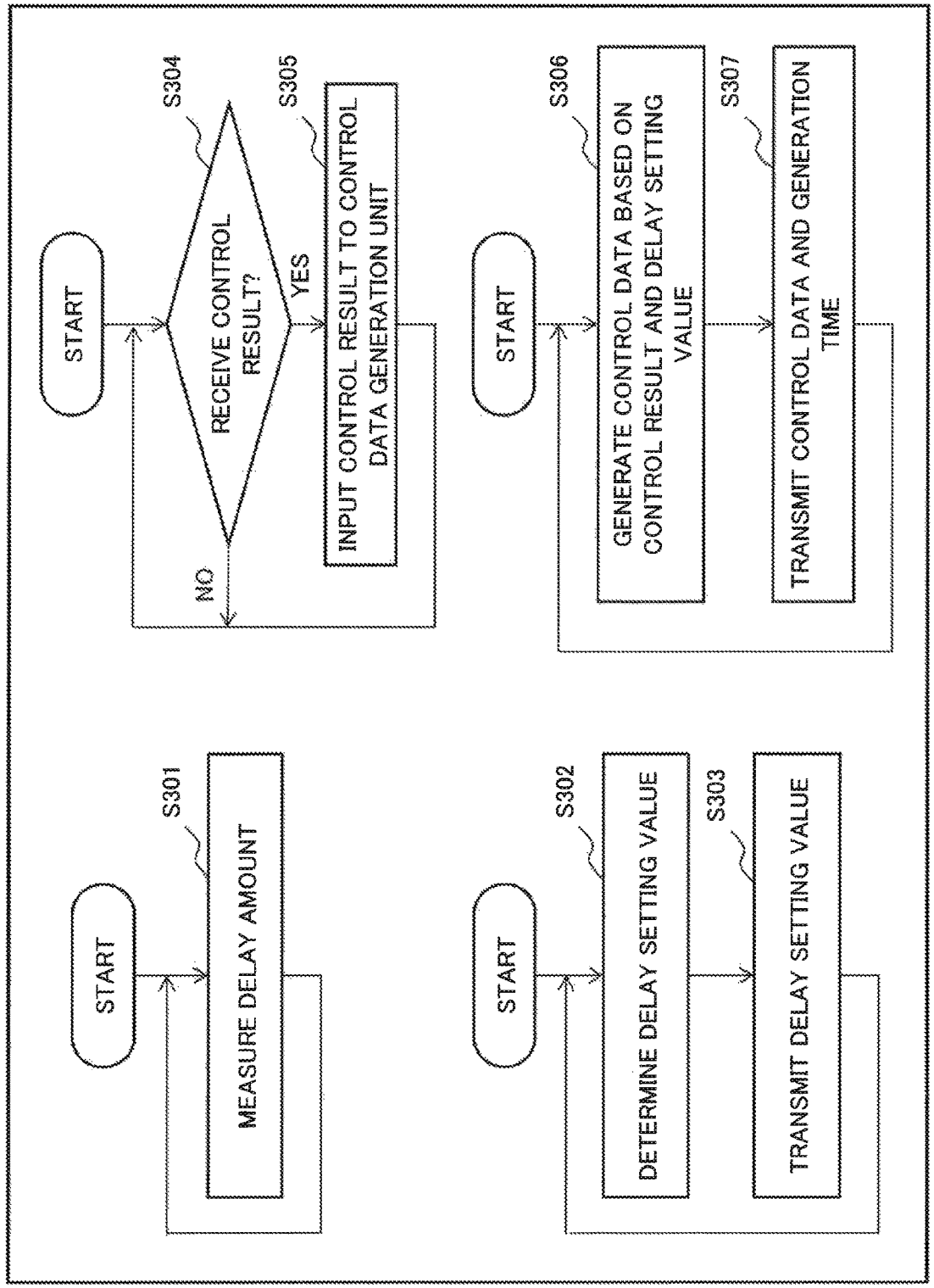
FIG. 7 shows a diagram illustrating an operational example of the remote control device according to the second example embodiment of the present invention.

Next, FIG. 7 illustrates an operational example of the remote control device 10 according to this example embodiment.

The delay setting value determination unit 13 of the remote control device 10 measures the delay amount between the remote control device 10 and the delay adjustment device 30 at a predetermined timing (at predetermined time intervals or the like) (step S301). Then, the delay setting value determination unit 13 determines the delay setting amount at the predetermined timing (step S302), and the delay setting value transmission unit 14 transmits the determined delay setting amount to the delay adjustment device 30 (step S303).

Further, the control result reception unit 11 receives the control result from the delay adjustment device 30 (YES in step S304), and inputs the control result to the control data generation unit 12 (step S305).

The control data generation unit 12 generates control data based on the control result and the delay setting value at the predetermined timing (step S306). Then, the control data transmission unit 15 transmits the generated control data to the delay adjustment device 30 together with the time when the control data are generated (step S307). For example, a field for the generation time may be included in a packet including the control data.

Figure 8:
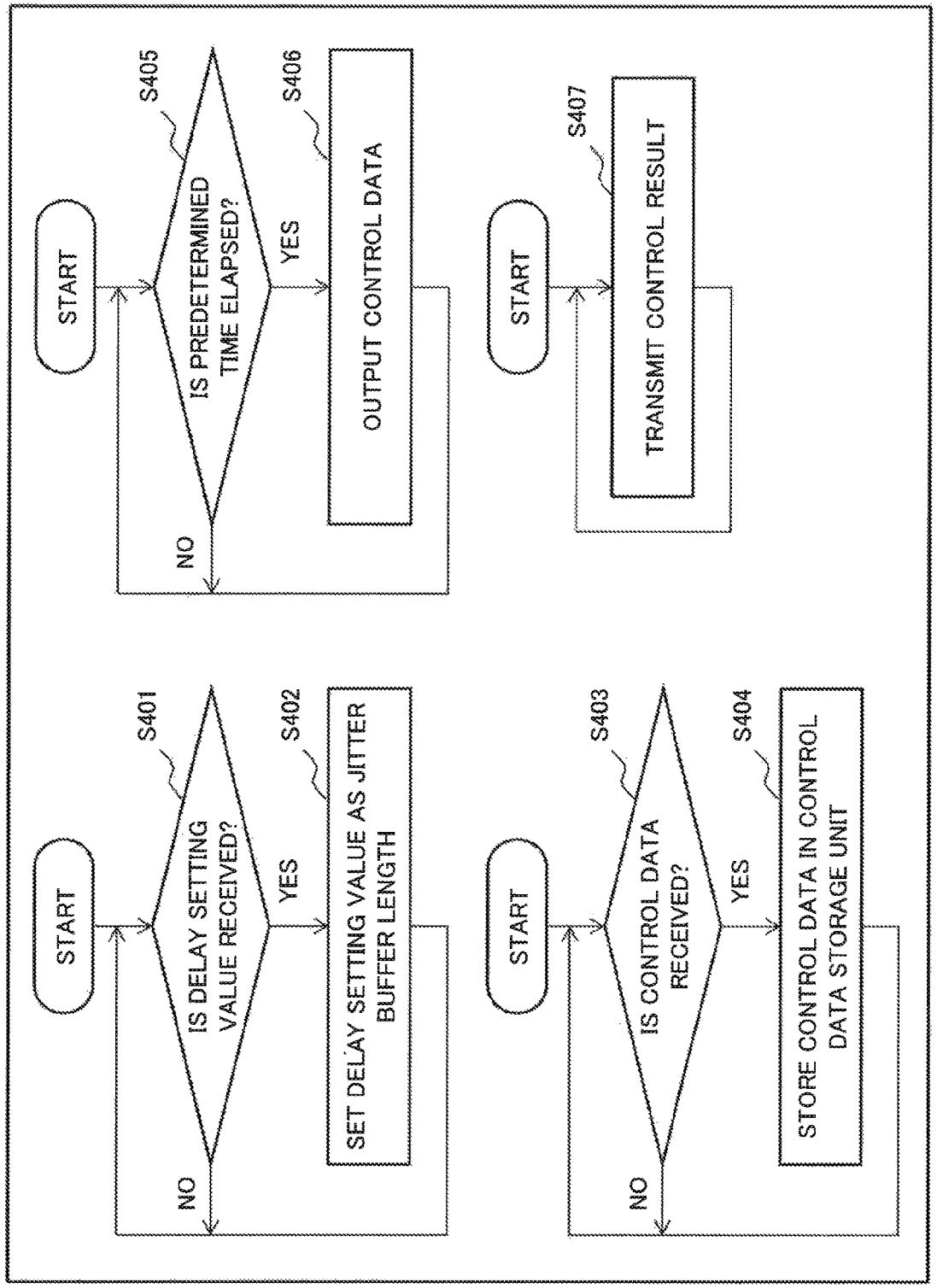
FIG. 8 shows a diagram illustrating an operational example of a delay adjustment device according to the second example embodiment of the present invention.

Next, FIG. 8 illustrates an operational example of the delay adjustment device 30 according to this example embodiment.

Upon receiving the delay setting value from the remote control device 10 (YES in step S401), the delay setting value reception unit 23 of the delay adjustment device 30 sets the delay setting value as a jitter buffer length for the control data storage unit 22 (step S402).

Upon receiving the control data from the remote control device 10 (YES in step S403), the control data reception unit 21 stores the control data in the control data storage unit 22 (step S404).

The control data output unit 34 retrieves the control data stored in the control data storage unit 22 after a lapse of a time corresponding to the delay setting value from the generation time of the control data (step S405), and outputs the control data to the control target 35 (step S406).

The control result transmission unit 36 transmits the control result for the control target 35 to the remote control device 10 at the predetermined timing (step S407).

By the operation as described above, the remote control device 10 determines the delay setting value based on the history of the delay amount, transmits the delay setting value to the delay adjustment device 30, and generates control data based on the delay setting value. The delay adjustment device 30 outputs, to the control target, the control data in the control data storage unit based on the delay setting value and the generation time of the control data. Thus, since the delay setting value can be determined based on the history of the delay amount, the transient response of remote control is improved. Further, since the control data can be output to the control target depending on the delay setting value used for generating the control data, the stability of remote control is improved. Therefore, it is possible to improve the transient response and stability of remote control when a transmission delay varies.

As described above, in the second example embodiment of the present invention, like in the first example embodiment, the remote control device 10 determines the delay setting value based on the history of the delay amount, transmits the delay setting value to the delay adjustment device 30, and generates control data based on the delay setting value. The delay adjustment device 30 outputs, to the control target, the control data in the control data storage unit based on the delay setting value and the generation time of the control data. Thus, since the delay setting value can be determined based on the history of the delay amount, the transient response of remote control is improved. Further, since the control data can be output to the control target depending on the delay setting value used for generating the control data, the stability of remote control is improved. Therefore, it is possible to improve the transient response and stability of remote control when a transmission delay varies.

Further, in this example embodiment, the delay adjustment device 30 outputs the control data to the control target after a lapse of a time corresponding to the delay setting value from the generation time of the control data. Thus, the delay adjustment device 30 can set the delay amount of the control data in such a way as to match the delay setting value, which makes it possible to further improve the stability of remote control.

Furthermore, in this example embodiment, the remote control device 10 calculates an upper limit of the delay amount in future based on the history of the delay amount, and uses the upper limit as the delay setting value. Thus, more delay jitters can be absorbed, which makes it possible to further improve the stability of remote control.

In this example embodiment, the remote control device 10 identifies a predetermined time series model from the history of the delay amount, derives a probability distribution of the delay amount in future from the time series model, and calculates an upper limit of the delay amount based on the probability distribution. Thus, it is possible to determine the delay setting value by taking into consideration a tradeoff between the stability and the transient response of control.

[Example of Simulation Result]

Figure 9:
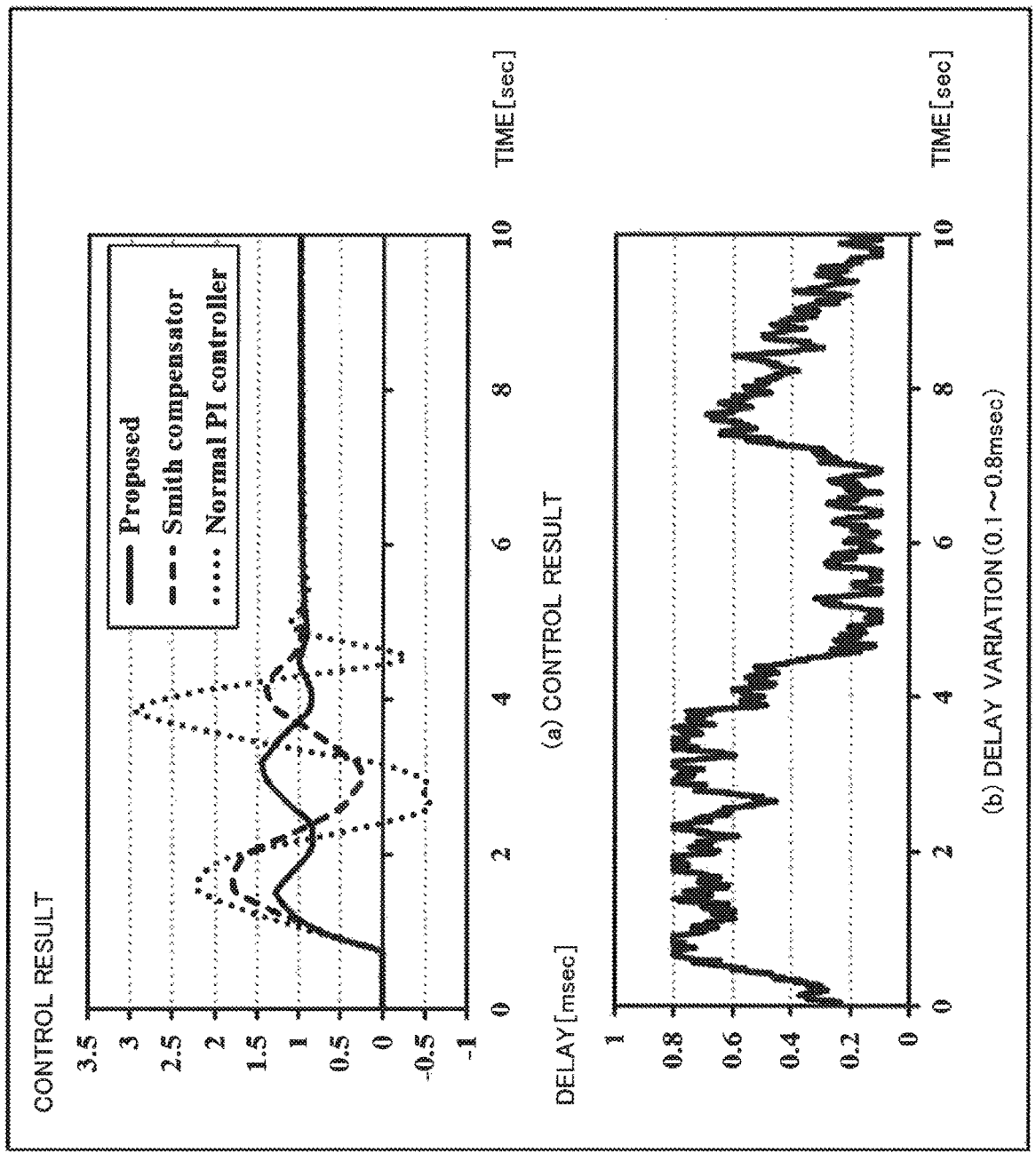
FIG. 9 shows graphs each illustrating an example of a simulation result according to the second example embodiment of the present invention.
Figure 10:
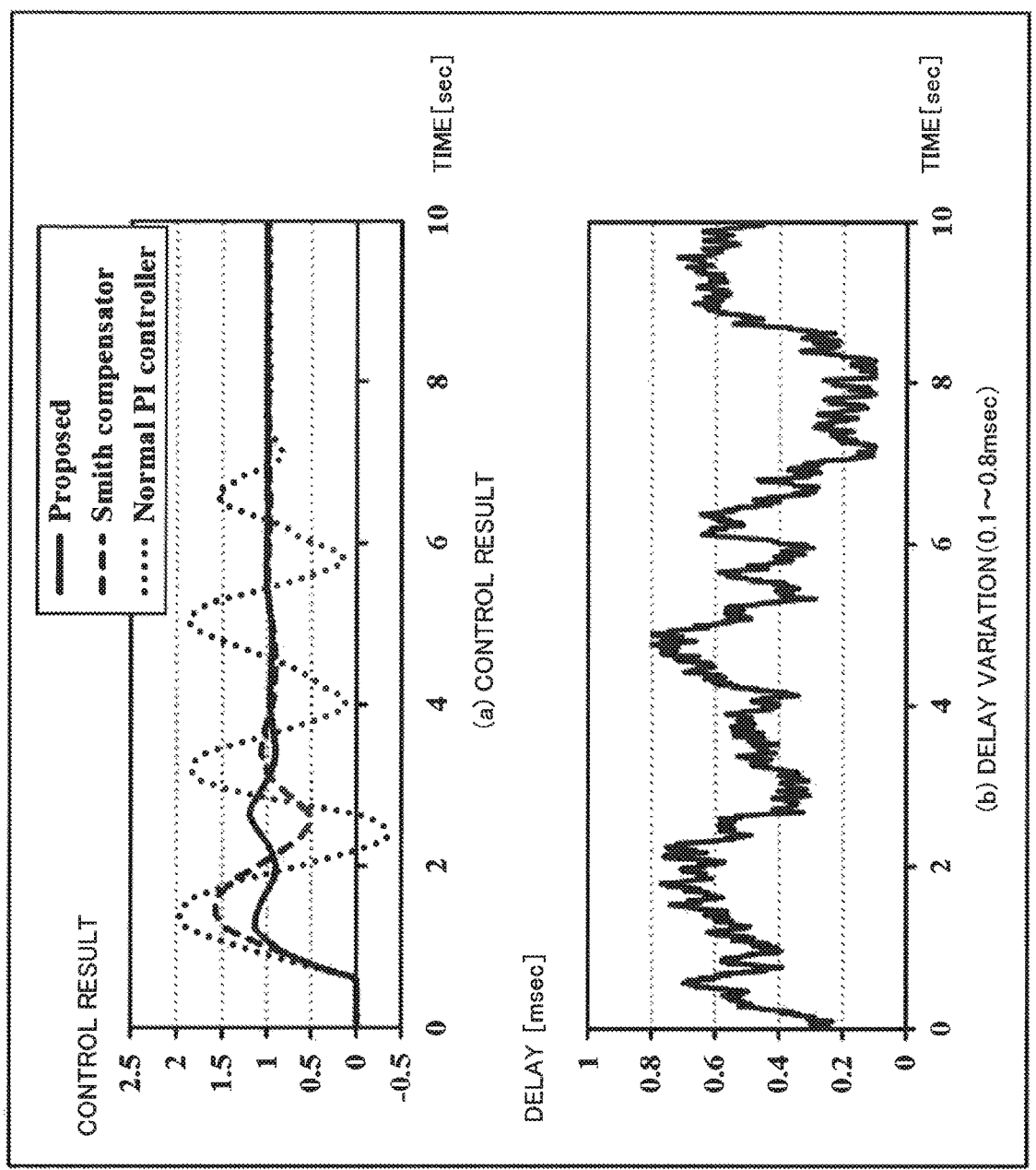
FIG. 10 shows graphs each illustrating an example of the simulation result according to the second example embodiment of the present invention.

Next, FIG. 9 and FIG. 10 illustrate examples of simulation results according to the second example embodiment.

For the control target (K=1, T=0.8) of a first-order lag system represented by the transfer function G(s) in Expression 4, control results when the initial value is 0 and the target value is 1 are measured by using three patterns of a normal PI compensator, a PI compensator with a Smith predictor (fixed delay), and the remote control system according to this example embodiment.

$$G(s)=K/(Ts+1) \qquad \text{(Expression 4)}$$

In this case, the delay amount L is randomly varied in a range from 0.1 msec to 0.8 msec.

FIG. 9 illustrates an example of a simulation result. FIG. 9(a) is a graph illustrating a control result, and FIG. 9(b) is a graph illustrating a variation in the delay amount L. The control result of the normal PI compensator (Normal PI controller) is not stabilized until the vicinity of 5 sec. It is obvious that the control performance of the PI compensator with the Smith predictor (Smith Compensator) (fixed delay) is improved as compared with the normal PI compensator, and transient characteristics of the remote control system (Proposed) according to this example embodiment can be improved. A Root Mean Squared Error (RMSE) between a control output and a target value for the normal PI compensator is 0.731, the RMSE for the PI compensator with the Smith predictor (fixed delay) is 0.415, and the RMSE for the remote control system according to the present invention is 0.320. This shows that the control performance of the remote control system according to this example embodiment is highest.

FIG. 10 illustrates an example of another result under the same simulation conditions as those used in FIG. 9. Also, this result shows that the RMSE between the control output and the target value for the normal PI compensator is 0.579, the RMSE for the PI compensator with the Smith predictor (fixed delay) is 0.324, and the RMSE for the remote control system according to this example embodiment is 0.278. Thus, the control performance of the remote control system according to this example embodiment is highest.

[Hardware Configuration Example]

A configuration example of hardware resources for implementing the remote control device 10 and the delay adjustment devices (20, 30, and 40) (hereinafter referred to as the remote control device and the like) according to each of the example embodiments of the present invention described above by using a single information processing device (computer) will be described. Note that the remote control device and the like may be implemented physically or functionally by using at least two information processing devices. The remote control device and the like may also be implemented as a dedicated device. Alternatively, only some of the functions of the remote control device and the like may be implemented by using information processing devices.

Figure 11:
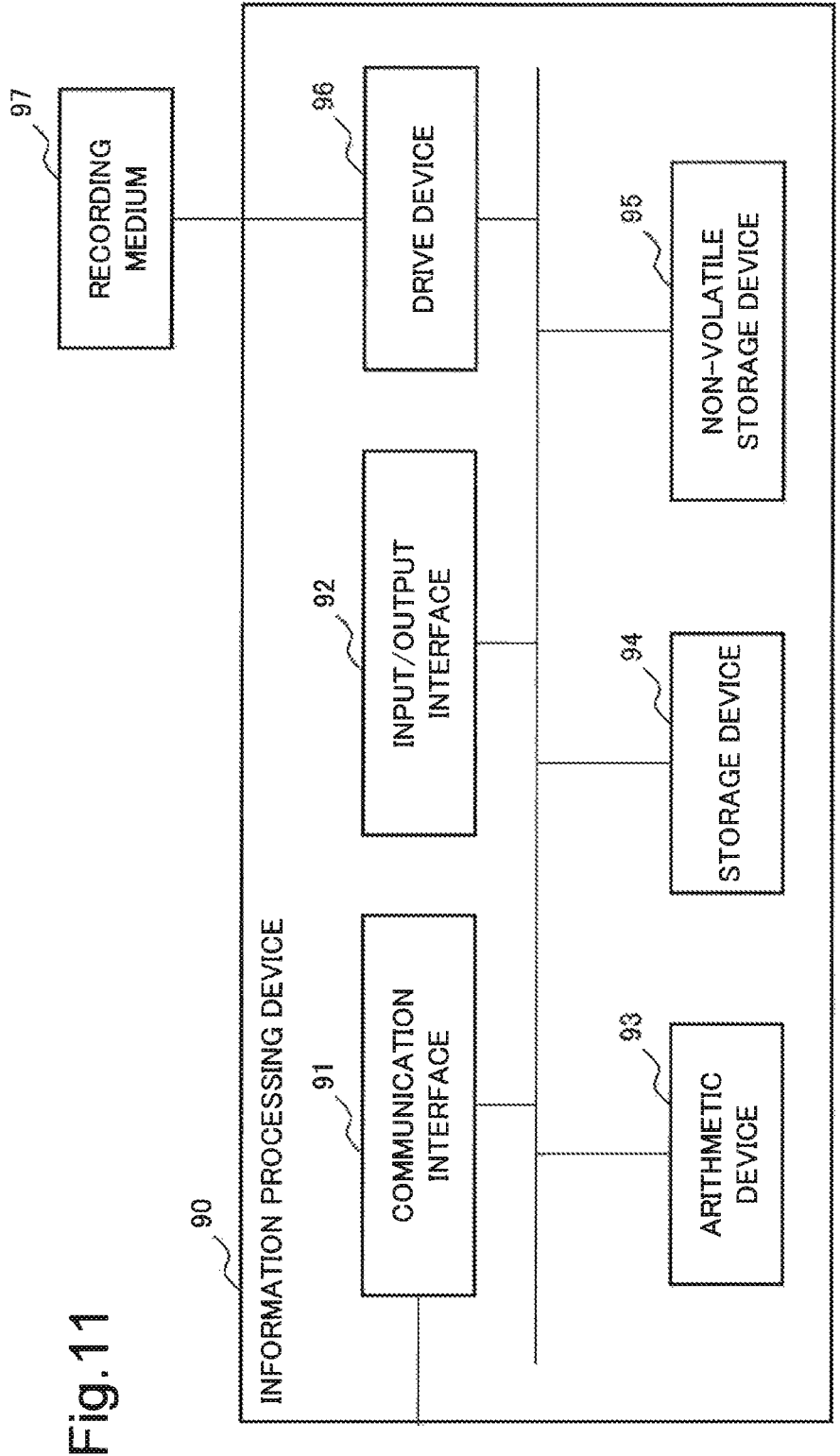
FIG. 11 shows a diagram illustrating a hardware configuration example according to each example embodiment of the present invention.

FIG. 11 is a diagram schematically illustrating a hardware configuration example of an information processing device capable of implementing the remote control device and the like according to each of the example embodiments of the present invention. The information processing device 90 includes a communication interface 91, an input/output interface 92, an arithmetic device 93, a storage device 94, a non-volatile storage device 95, and a drive device 96.

The communication interface 91 is a communication means used for the remote control device and the like according to each of the example embodiments to communicate with an external device with a wired or/and wireless connection. Note that when the remote control device and the like are implemented by using at least two information processing devices, these devices may be connected in such a way that the devices can communicate with each other via the communication interface 91.

The input/output interface 92 is a man-machine interface such as a keyboard, which is an example of an input device, or a display, which is an output device.

The arithmetic device 93 is an arithmetic processing unit such as a general-purpose Central Processing Unit (CPU) or a microprocessor. The arithmetic device 93 reads out, for example, various programs stored in the non-volatile storage device 95 into the storage device 94, and can execute processing based on the read programs.

The storage device 94 is a memory device, such as a Random Access Memory (RAM), which can be referenced from the arithmetic device 93, and stores programs, various data, and the like. The storage device 94 may be a volatile memory device.

The non-volatile storage device 95 is, for example, a non-volatile storage device such as a Read Only Memory (ROM) or a flash memory, and can store various programs, data, and the like.

The drive device 96 is, for example, a device that performs processing to read and write data from and to a recording medium 97 to be described below.

The recording medium 97 is, for example, any recording medium capable of recording data, such as an optical disk, a magneto-optical disk, or a semiconductor flash memory.

Each of the example embodiments of the present invention may be implemented by, for example, configuring the remote control device and the like by the information processing device 90 illustrated in FIG. 11, and supplying a program capable of implementing the functions described in each of the above-described example embodiments to the remote control device and the like.

In this case, the program supplied to the remote control device and the like is executed by the arithmetic device 93, thereby making it possible to implement each of the example embodiments. Not all the functions of the remote control device and the like, but some of the functions may be configured by the information processing device 90.

Furthermore, the above-described program may be stored in the recording medium 97, and the program may be configured to be stored, as needed, in the non-volatile storage device 95 at the shipment stage, the operation stage, or the like of the remote control device and the like. Note that in this case, as a method for supplying the program, a method for installing the program into the remote control device and the like by using an appropriate jig at the production stage before shipment, or at the operation stage, or the like may be employed. As the method for supplying the program, a general procedure, such as a method of downloading the program from an external device via a communication line such as the Internet, may also be employed.

The whole or part of the example embodiments disclosed above can be described as, but not limited to, the following supplementary notes.

(Supplementary Note 1)

A remote control device comprising:

a control result reception means for receiving a control result from a control target device;

a control data generation means for generating control data for performing a feedback control with dead time compensation on the control target device, based on the control result and a delay setting value;

a delay setting value determination means for determining the delay setting value, based on a history of a delay amount of transmitted/received data transmitted/received to/from the control target device;

a delay amount transmission means for transmitting the delay setting value; and a control data transmission means for transmitting the control data and a generation time of the control data.

(Supplementary Note 2)

The remote control device according to Supplementary note 1, wherein the delay setting value determination means calculates an upper limit of the delay amount in future, based on the history of the delay amount, and uses the upper limit as the delay setting value.

(Supplementary Note 3)

The remote control device according to Supplementary note 2, wherein the delay setting value determination means identifies a predetermined time series model, based on the history of the delay amount, derives a probability distribution of the delay amount in future from the time series model, and performs the calculation of the upper limit of the delay amount, based on the probability distribution.

(Supplementary Note 4)

The remote control device according to any one of Supplementary notes 1 to 3, wherein a Smith predictor is used for the dead time compensation.

(Supplementary Note 5)

A delay adjustment device comprising:

a control data reception means for receiving control data from a remote control device and storing the control data in a control data storage means;

a delay setting value reception means for receiving a delay setting value to be used for dead time compensation in the remote control device; and a control data output means for outputting, to a control target, the control data in the control data storage means, based on the delay setting value and a generation time of the control data.

(Supplementary Note 6)

The delay adjustment device according to Supplementary note 5, wherein the control data output means performs the output of the control data to the control target at a time after a lapse of the delay setting value from the generation time.

(Supplementary Note 7)

A remote control system comprising:

the remote control device according to any one of Supplementary notes 1 to 4; and the control target device, wherein the control target device is the delay adjustment device according to Supplementary note 5 or 6.

(Supplementary Note 8)

A remote control system comprising:

the remote control device according to any one of Supplementary notes 1 to 4;

a delay adjustment device; and the control target device, wherein the delay adjustment device is the delay adjustment device according to Supplementary note 5 or 6.

(Supplementary Note 9)

A remote control method comprising:

receiving a control result from a control target device;

generating control data for performing a feedback control with dead time compensation on the control target device, based on the control result and a delay setting value;

determining the delay setting value, based on a history of a delay amount of transmitted/received data transmitted/received to/from the control target device;

transmitting the delay setting value; and transmitting the control data and a generation time of the control data.

(Supplementary Note 10)

The remote control method according to Supplementary note 9, further comprising calculating an upper limit of the delay amount in future, based on the history of the delay amount, and using the upper limit as the delay setting value.

(Supplementary Note 11)

The remote control method according to Supplementary note 10, further comprising identifying a predetermined time series model, based on the history of the delay amount, deriving a probability distribution of the delay amount in future from the time series model, and performing the calculation of the upper limit of the delay amount, based on the probability distribution.

(Supplementary Note 12)

The remote control method according to any one of Supplementary notes 9 to 11, wherein a Smith predictor is used for the dead time compensation.

(Supplementary Note 13)

A delay adjustment method comprising:

receiving control data from a remote control device and storing the control data in a control data storage unit;

receiving a delay setting value to be used for dead time compensation in the remote control device; and outputting, to a control target, the control data in the control data storage unit, based on the delay setting value and a generation time of the control data.

(Supplementary Note 14)

The delay adjustment method according to Supplementary note 13, further comprising performing the output of the control data to the control target at a time after a lapse of the delay setting value from the generation time.

(Supplementary Note 15)

A remote control program causing a computer to execute:

a control result reception function of receiving a control result from a control target device;

a control data generation function of generating control data for performing a feedback control with dead time compensation on the control target device, based on the control result and a delay setting value;

a delay setting value determination function of determining the delay setting value, based on a history of a delay amount of transmitted/received data transmitted/received to/from the control target device;

a delay amount transmission function of transmitting the delay setting value; and a control data transmission function of transmitting the control data and a generation time of the control data.

(Supplementary Note 16)

The remote control program according to Supplementary note 15, wherein the delay setting value determination function calculates an upper limit of the delay amount in future, based on the history of the delay amount, and uses the upper limit as the delay setting value.

(Supplementary Note 17)

The remote control program according to Supplementary note 16, wherein the delay setting value determination function identifies a predetermined time series model, based on the history of the delay amount, derives a probability distribution of the delay amount in future from the time series model, and performs the calculation of the upper limit of the delay amount, based on the probability distribution.

(Supplementary Note 18)

The remote control program according to any one of Supplementary notes 15 to 17, wherein a Smith predictor is used for the dead time compensation.

(Supplementary Note 19)

A delay adjustment program causing a computer to execute:

a control data reception function of receiving control data from a remote control device and storing the control data in a control data storage unit;

a delay setting value reception function of receiving a delay setting value to be used for dead time compensation in the remote control device; and a control data output function of outputting, to a control target, the control data in the control data storage unit, based on the delay setting value and a generation time of the control data.

(Supplementary Note 20)

The delay adjustment program according to Supplementary note 19, wherein the control data output function performs the output of the control data to the control target at a time after a lapse of the delay setting value from the generation time.

(Supplementary Note 21)

A non-transitory computer readable recording medium recorded with the remote control program according to any one of Supplementary notes 15 to 18.

(Supplementary Note 22)

A non-transitory computer readable recording medium recorded with the delay adjustment program according to Supplementary note 19 or 20.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Remote control device
11 Control result reception unit
12 Control data generation unit
13 Delay setting value determination unit
14 Delay setting value transmission unit
15 Control data transmission unit
20, 30, 40 Delay adjustment device
21 Control data reception unit
22 Control data storage unit
23 Delay setting value reception unit
24, 34, 44 Control data output unit
35 Control target
36 Control result transmission unit
50 Control target device
80 Network
90 Information processing device
91 Communication interface 92 Input/output interface
93 Arithmetic device
94 Storage device
95 Non-volatile storage device
96 Drive device
97 Recording medium

The invention claimed is:

1. A remote control device comprising:
a communication interface; and
a processor configured to:
receive, via the communication interface, a control result from a control target device wherein the control result is a result of controlling the control target device;
determine a delay setting value, based on a history of a delay amount of data that is transmitted to or received from the control target device;
control the communication interface to transmit the delay setting value to a delay adjustment device that controls the control target device;
generate control data for performing a feedback control with dead time compensation on the control target device, based on the control result and the delay setting value; and
control the communication interface to transmit a packet that includes the control data and a generation time of the control data to the delay adjustment device that controls the control target device.

2. The remote control device according to claim 1, wherein the processor is further configured to: calculate an upper limit of the delay amount in the future, based on the history of the delay amount, and use the upper limit as the delay setting value.

3. The remote control device according to claim 2, wherein the processor is further configured to:
identify a predetermined time series model, based on the history of the delay amount,
derive a probability distribution of the delay amount in the future from the predetermined time series model, and
calculate the upper limit of the delay amount, based on the probability distribution.

4. The remote control device according to claim 1, wherein a Smith predictor is used for the dead time compensation.

5. A remote control method comprising:
receiving, by a remote control device, a control result from a control target device, wherein the control result is a result of controlling the control target device;
determining, by the remote control device, a delay setting value, based on a history of a delay amount of that is transmitted to or received from the control target device;
transmitting, by the remote control device, the delay setting value to a delay adjustment device that controls the control target device;
generating, by the remote control device, control data for performing a feedback control with dead time compensation on the control target device, based on the control result and the delay setting value; and
transmitting, by the remote control device, a packet that includes the control data and a generation time of the control data to the delay adjustment device that controls the control target device.

6. The remote control method according to claim 5, further comprising calculating an upper limit of the delay amount in the future, based on the history of the delay amount, and using the upper limit as the delay setting value.

7. The remote control method according to claim 6, further comprising:
identifying a predetermined time series model, based on the history of the delay amount,
deriving a probability distribution of the delay amount in future from the predetermined time series model, and
calculating the upper limit of the delay amount, based on the probability distribution.

8. The remote control method according to claim 5, wherein a Smith predictor is used for the dead time compensation.

9. The remote control method according to claim 5, further comprising:
outputting, by the delay adjustment device, the control data to the remote control device, based on the delay setting value and the generation time of the control data.

10. The remote control method according to claim 5, further comprising:
outputting, by the delay adjustment device, the control data to the remote control device after a lapse of a time corresponding to the delay setting value from the generation time of the control data.

11. A non-transitory computer readable recording medium storing computer-executable instructions that, when executed by a processor of a remote control device, cause the processor to:
receive a control result from a control target device, wherein the control result is a result of controlling the control target device;
determine a delay setting value, based on a history of a delay amount of that is transmitted to or received from the control target device;
transmit the delay setting value to a delay adjustment device that controls the control target device;
generate control data for performing a feedback control with dead time compensation on the control target device, based on the control result and the delay setting value; and
transmit a packet that includes the control data and a generation time of the control data to the delay adjustment device that controls the control target device.

12. The non-transitory computer readable recording medium according to claim 11, wherein the computer-executable instructions are further configured to cause the processor to:
calculate an upper limit of the delay amount in the future, based on the history of the delay amount, and use the upper limit as the delay setting value.

13. The non-transitory computer readable recording medium according to claim 12, wherein the computer-executable instructions are further configured to cause the processor to:
identify a predetermined time series model, based on the history of the delay amount,
derive a probability distribution of the delay amount in future from the predetermined time series model, and
calculate the upper limit of the delay amount, based on the probability distribution.

14. The non-transitory computer readable recording medium according to claim 11, wherein a Smith predictor is used for the dead time compensation.

* * * * *